US008401226B2

(12) United States Patent
Rico

(10) Patent No.: US 8,401,226 B2
(45) Date of Patent: Mar. 19, 2013

(54) METHOD OF ACCESSING DIGITAL IMAGES OF MAILPIECES FRANKED BY A STANDARD FRANKING MACHINE

(75) Inventor: Rubén Rico, Paris (FR)

(73) Assignee: Neopost Technologies, Bagneux (FR)

( * ) Notice: Subject to any disclaimer, the term of this patent is extended or adjusted under 35 U.S.C. 154(b) by 1021 days.

(21) Appl. No.: 12/348,596

(22) Filed: Jan. 5, 2009

(65) Prior Publication Data

US 2009/0182751 A1 Jul. 16, 2009

(30) Foreign Application Priority Data

Jan. 15, 2008 (FR) ..................................... 08 50222

(51) Int. Cl.
*G06K 9/00* (2006.01)

(52) U.S. Cl. ....................................... 382/101; 705/401

(58) Field of Classification Search .................. 382/101, 382/102; 705/401, 404, 406
See application file for complete search history.

(56) References Cited

U.S. PATENT DOCUMENTS

| | | | | |
|---|---|---|---|---|
| 5,770,841 | A | 6/1998 | Moed et al. | 235/375 |
| 7,058,610 | B1 * | 6/2006 | Pintsov | 705/62 |
| 2004/0083189 | A1 | 4/2004 | Leon | 705/401 |
| 2004/0139033 | A1 * | 7/2004 | Amato | 705/400 |

FOREIGN PATENT DOCUMENTS

| | | | |
|---|---|---|---|
| EP | 1 345 181 | A2 | 9/2003 |

* cited by examiner

*Primary Examiner* — Andrew W Johns
(74) *Attorney, Agent, or Firm* — Sughrue Mion, PLLC

(57) ABSTRACT

A method of accessing digital images of mailpieces from a workstation of a sender, includes franking the mailpieces on a franking machine of the sender; acquiring a digital image of each of the franked mailpieces at an office for receiving the mailpieces; extracting, from the digital images, a first identifier of the sender and a second identifier of a dealer of the franking machine; feeding a first database with the digital images and with the identifiers; making portions of the first database available to each of the servers of the dealers, the portions being determined as a function of the second identifier; feeding a second database with the determined portion; making portions of the second database available to a workstation of each of the senders, the portions being determined as a function of the first identifier; and accessing the digital image of each of the franked mailpieces on the workstation.

6 Claims, 2 Drawing Sheets

METHOD OF ACCESSING DIGITAL IMAGES OF MAILPIECES FRANKED BY A STANDARD FRANKING MACHINE

FIELD OF THE INVENTION

The present invention relates to the field of mail handling, and it relates more particularly to a method enabling the sender of a mailpiece to access a digital image of said mailpiece, in particular for implementing added-value postal services.

PRIOR ART

In order to implement added-value postal services such as registered mail, mail tracking, etc., it is necessary for the operator of a franking machine or "postage meter" to perform various successive manual inputting operations that, in addition to taking time, are sources of frequent errors. In order to accelerate that inputting process, it is known that it is possible to incorporate a scanner into the franking machine. Associated with specially adapted recognition software and with an address database, such a scanner makes it possible to automate inputting the identifier of the requested service, and the name and post code or "ZIP code" of the recipient.

Unfortunately, adding such scanner means to a standard franking machine is particular costly because it usually requires new mail handling equipment to be used.

OBJECT AND DEFINITION OF THE INVENTION

An object of the present invention is thus to provide a method of accessing a digital image of a mailpiece for the purpose of implementing added-value postal services that does not make it necessary to modify the existing equipment configuration of the sender of the mailpiece, and in particular that does not make it necessary to replace the sender's franking machine.

This object is achieved by a method of accessing digital images of mailpieces from workstations of senders of said mailpieces, which method comprises the following steps:

at each of the senders of said mailpieces:

franking said mailpieces on at least one franking machine fed with said mailpieces;

at an office of a postal authority:

acquiring a digital image of each of said mailpieces as franked, by using optical reader means to perform the acquisition;

extracting, from each of said digital images, at least an identifier of the sender and an identifier of a dealer of the franking machine that franked the mailpiece whose digital image has been acquired;

feeding a first database with said digital images and with at least said identifiers, each of the recordings in said database comprising one of said digital images and at least said identifiers that are associated therewith; and transferring portions of said first database to each of the servers of the dealers of the franking machines of the senders, said portions of said first database being determined as a function of said identifier of the dealer;

at each of said servers of the dealers of said franking machines:

feeding a second database with said determined portion of said first database; and transferring portions of said second database to a workstation of each of the senders, said portions of said second database being determined as a function of said identifier of the sender; and at said workstation of each of the senders:

accessing the digital image of each of the mailpieces franked on said at least one franking machine of the sender.

Thus, the sender can have access to digital images of the mailpieces sent by said sender, even though the sender's standard franking machine is not provided with scanner means enabling such digital images to be obtained. The sender can thus access added-value services that said sender was hitherto unable to access.

In a variant implementation, the step of transferring determined portions of said first database is replaced with a step of making said determined portions of said first database available to each of the servers of the dealers of the franking machines of the senders.

In another variant, the step of transferring determined portions of said second database is replaced with a step of making said determined portions of said second database available to a workstation of each of the senders.

Advantageously, the method of the invention further comprises a step of extracting at least one item of postal data from a recipient address block of each of said mailpieces, by using recognition software means to perform the extraction, and a step of verifying said at least one item of postal data, and of correcting it if necessary, as a function of a database of addresses that is available to the postal authority. The method of the invention may also further comprise a step of accessing said at least one item of postal data from said workstation, said at least one item of postal data being as it was initially or as corrected.

BRIEF DESCRIPTION OF THE DRAWINGS

The characteristics and advantages of the present invention appear more clearly from the following description given by way of non-limiting indication and with reference to the accompanying drawings, in which.

DETAILED DESCRIPTION OF A PREFERRED IMPLEMENTATION

The invention proposes a method making it possible to access a digital image of a mailpiece as is necessary for implementing added-value postal services on mailpieces printed by a franking machine. For this purpose, the sender who has produced the mailpiece franks it. As is known, the resulting postal imprint contains identifiers such as the contract number of the sender and the contract number of the dealer. On receiving mail, the postal authority scans it and extracts various items of postal data from the scans, in particular the recipient addresses. These data items are then sent to the dealer or made available to said dealer on a server so that said dealer can, in turn, send them to each of the senders.

Figure 1:
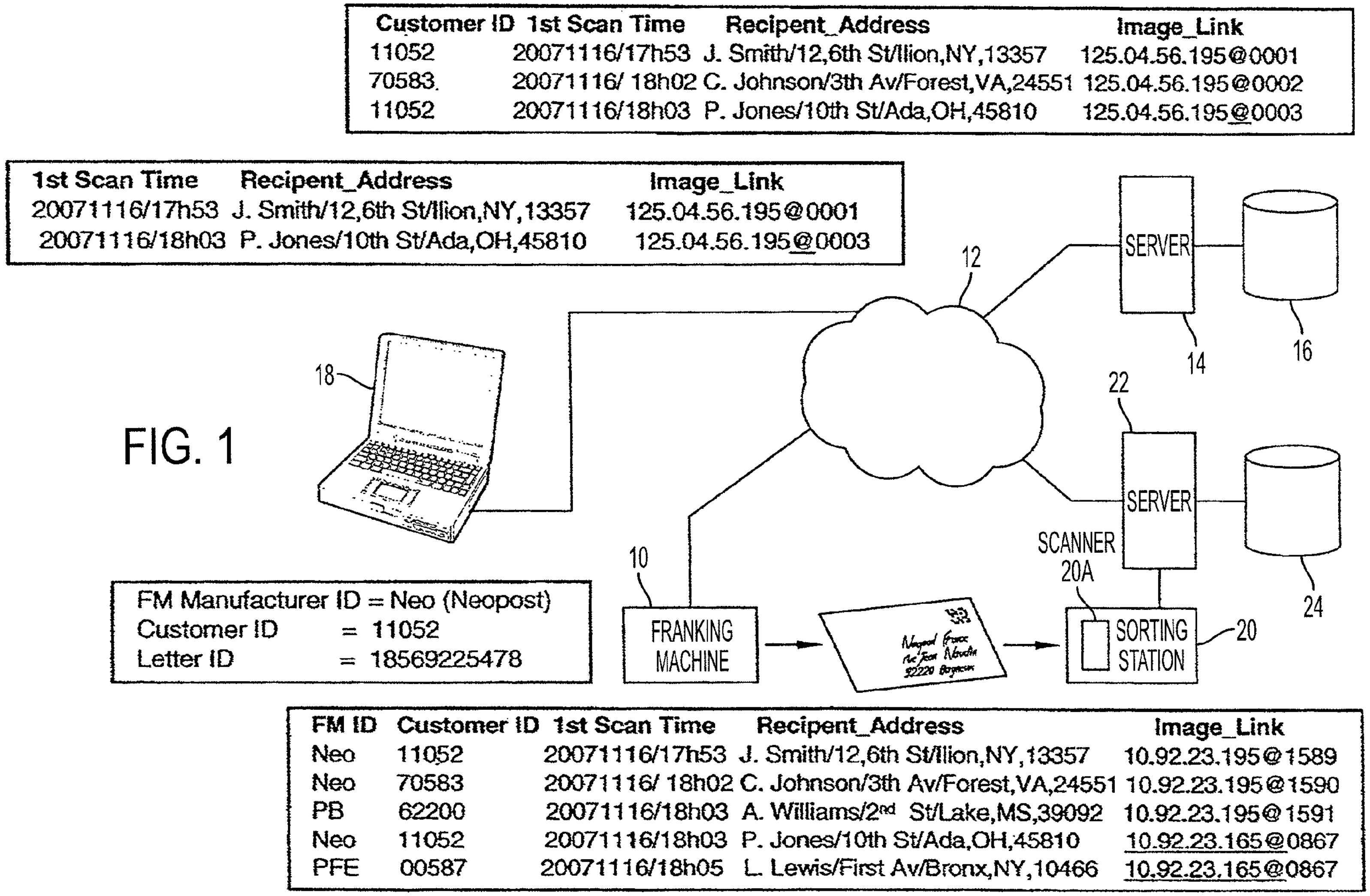
FIG. 1 shows an architecture of a mail handling system in which the method of the invention is implemented.

FIG. 1 diagrammatically shows an architecture in which the method of the invention can be implemented, which architecture is that of a mail handling system for handling mail between a sender of mailpieces and a postal authority entrusted with the task of delivering the mailpieces (naturally, it is also possible to imagine this task being entrusted to a private carrier).

As shown, the sender is provided with at least one franking machine 10 for inserting into envelopes and for franking mailpieces to be sent. This franking machine is connected via a communications network, preferably the Internet 12, to a server 14 of the dealer of said machine, which server is connected to a postal database 16 containing postal data. Said server can also be accessed by the sender via a standard user workstation 18 that is advantageously provided with an Internet browser.

Once franked by the sender, the mailpiece is handed over to an office of the postal authority, which office conventionally includes a mailpiece sorting station 20 in communication with a computer server 22 connected to a franking database 24 containing franking data. The computer server of the postal authority is also connected to the server of the dealer of the franking machine via the communications network 12. As is known, the sorting station includes a scanner 20A for acquiring an image each mailpiece received and for extracting from said image various items of postal data that are useful for validating said mailpiece, such as the identifiers both of the sender and of the dealer, the recipient address, or the amount of the franking or "postage amount".

Figure 2:
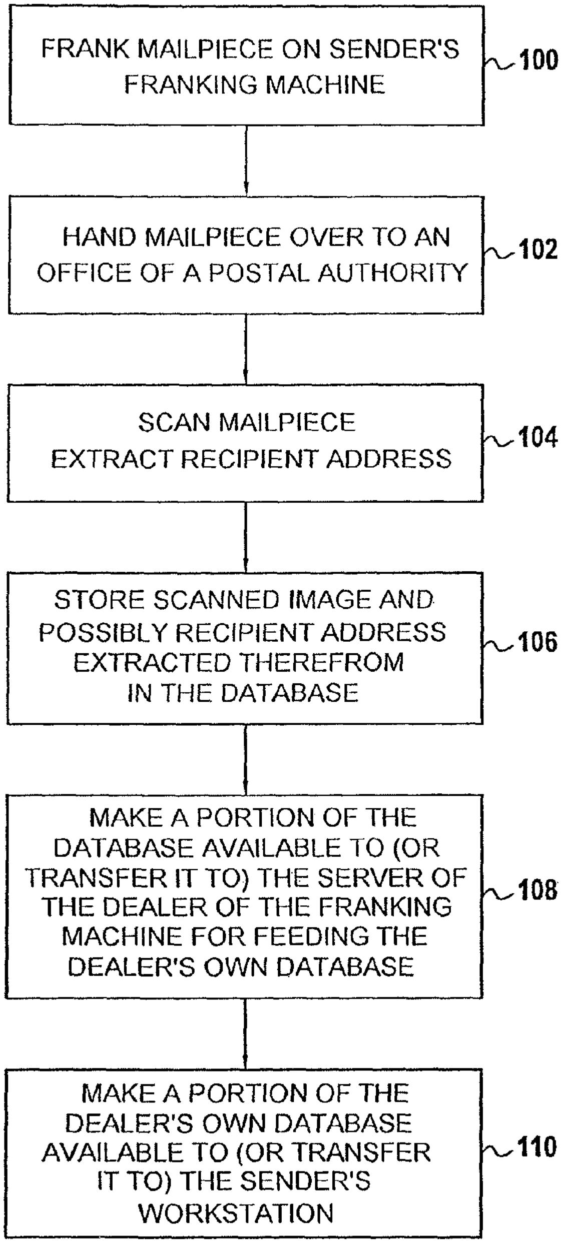
FIG. 2 is a flow chart showing an example of the method of the invention for accessing a digital image of a mailpiece.

The method of the invention that is implemented in the above-mentioned mail handling system is described below more particularly, with reference to FIG. 2.

In a first step 100, the sender franks a mailpiece at the franking machine 10, this franking consisting in printing a postal imprint in the form of bar codes (e.g. of the Data Matrix type), which imprint contains in known manner at least an identifier of the sender (Customer ID), an identifier of the franking machine (FM manufacturer ID), and, possibly, an identifier of the mailpiece (Letter ID) when such an identifier is present. In the next step 102, the mailpiece is handed over to an office of a postal authority. In a step 104, said mailpiece is scanned at the sorting station 20 of said office. This step consists in scanning the mailpiece in full, so as to extract the recipient address from the scan and so as to verify and, if necessary, correct said address as a function of a database of addresses that is available to the postal authority. If necessary, this scanning can be assisted by an operator so that it is possible to assign bar codes (e.g. of the POSTNET type) to all of the mailpieces so as to facilitate handling thereof by sorting machines with a view to delivering said mailpieces to their recipients. Said scanning also makes it possible to retrieve the various items of franking data making up the postal imprint, and in particular the identifiers of the sender and of the dealer.

In the next step 106, at least the captured image of the mailpiece, and preferably also the address extracted from said image and the corrected address are stored in the database 24 of the postal authority with the data relating to the identifiers of the sender and of the dealer as extracted from the postal imprint. Time-and-date stamping is added to these items of data, which stamping corresponds to the instant at which the mailpiece is scanned. Each of these six elements then constitutes a distinct field of the database, namely: a field for the dealer's identifier, a field for the sender's identifier, a field for the scanning instant, a field for the extracted initial address, a field for the corrected address, and a field for the captured image.

In a variant, only the corrected address can be stored and the initial address field is then replaced by another field including a marker indicating that the recorded address is a corrected address. Said marker then advantageously has three states (Y; N; U) corresponding respectively to a corrected address, to a non-corrected address, and to an invalid address (when the marker is in the "invalid address" state, the mailpiece is not processed).

In a step 108, this database of the postal authority, which database contains a new recording each time a new mailpiece is scanned, is made available to each of the dealers of the franking machines, and the dealers can then extract from said database the data that concerns them personally, i.e. the data for which the identifier associated with the above-mentioned first field corresponds to them, and, in particular, can extract from said database the images captured by the sorting station of the postal authority and available in the above-mentioned last field so as to feed their own databases 16.

In a variant, it is the postal authority that transfers to each dealer on the dealer's own server 14 the data corresponding to the dealer's franking machines, thereby enabling the dealer to feed its own database 16.

It should be noted that, if the postal authority only authorizes retrieval of the images of the mailpieces, the dealer's server is then advantageously provided with recognition means, preferably of the Optical Character Recognition (OCR) type, so as to extract the recipient address from said image.

Once the dealer has this data in its possession, said dealer can, in a step 110, in turn make said data available to each of the senders who can access said data from their workstations 18, or indeed said dealer can transfer said data to said workstations so that the senders can use said data as they see fit, e.g. for the purposes of added-value services.

Thus, with the present invention, the sender does not need to add to its equipment in order to access said added-value services that can be implemented on current franking machines.

For example, the sender can use the invention to create a database of sent letters as evidence of franking or of sending. Where applicable, the amount of the franking can be returned to the sender for invoicing. The sender's own database can be corrected with the corrected addresses received from the postal authority. In addition, when the database is accessible directly on the website of the dealer, no particular software infrastructure is necessary at the sender's workstation.

What is claimed is:

1. A method of accessing digital images of mailpieces from workstations of senders of said mailpieces, which method comprises the following steps:

at each of the senders of said mailpieces:

franking said mailpieces on at least one franking machine fed with said mailpieces;

at an office of a postal authority:

acquiring a digital image of each of said mailpieces as franked, by using optical reader means to perform the acquisition;

extracting, from each of said digital images, at least an identifier of the sender and an identifier of a dealer of the franking machine that franked the mailpiece whose digital image has been acquired;

feeding a first database with said digital images and with at least said identifiers, each of the recordings in said database comprising one of said digital images and at least said identifiers that are associated therewith; and transferring portions of said first database to each of the servers of the dealers of the franking machines of the senders, said portions of said first database being determined as a function of said identifier of the dealer;

at each of said servers of the dealers of said franking machines:

feeding a second database with said determined portion of said first database; and transferring portions of said second database to a workstation of each of the senders, said portions of said second database being determined as a function of said identifier of the sender; and at said workstation of each of the senders:

accessing the digital image of each of the mailpieces franked on said at least one franking machine of the sender.

2. A method of accessing digital images of mailpieces from workstations of senders of said mailpieces, which method comprises the following steps:

at each of the senders of said mailpieces:

franking said mail pieces on at least one franking machine fed with said mailpieces;

at an office of a postal authority:

acquiring a digital image of each of said mailpieces as franked, by using optical reader means to perform the acquisition;

extracting, from each of said digital images, at least an identifier of the sender and an identifier of a dealer of the franking machine that franked the mail piece whose digital image has been acquired;

feeding a first database with said digital images and with at least said identifiers, each of the recordings in said database comprising one of said digital images and at least said identifiers that are associated therewith; and making portions of said first database available to each of the servers of the dealers of the franking machines of the senders, said portions of said first database being determined as a function of said identifier of the dealer;

at each of said servers of the dealers of said franking machines:

feeding a second database with said determined portion of said first database; and transferring portions of said second database to a workstation of each of the senders, said portions of said second database being determined as a function of said identifier of the sender; and at said workstation of each of the senders:

accessing the digital image of each of the mailpieces franked on said at least one franking machine of the sender.

3. A method of accessing digital images of mailpieces according to claim 2, further comprising a step of extracting at least one item of postal data from a recipient address block of each of said mailpieces, by using recognition software means to perform the extraction.

4. A method of accessing digital images of mailpieces according to claim 3, further comprising a step of verifying said at least one item of postal data, and of correcting it if necessary, as a function of a database of addresses that is available to the postal authority.

5. A method of accessing digital images of mailpieces according to claim 3, further comprising a step of accessing said at least one item of postal data from said workstation, said at least one item of postal data being as it was initially or as corrected.

6. A method of accessing digital images of mailpieces from workstations of senders of said mailpieces, which method comprises the following steps:

at each of the senders of said mailpieces:

franking said mailpieces on at least one franking machine fed with said mailpieces;

at an office of a postal authority:

acquiring a digital image of each of said mailpieces as franked, by using optical reader means to perform the acquisition;

extracting, from each of said digital images, at least an identifier of the sender and an identifier of a dealer of the franking machine that franked the mailpiece whose digital image has been acquired;

feeding a first database with said digital images and with at least said identifiers, each of the recordings in said database comprising one of said digital images and at least said identifiers that are associated therewith; and transferring portions of said first database to each of the servers of the dealers of the franking machines of the senders said portions of said first database being determined as a function of said identifier of the dealer;

at each of said servers of the dealers of said franking machines:

feeding a second database with said determined portion of said first database; and making portions of said second database available to a workstation of each of the senders, said portions of said second database being determined as a function of said identifier of the sender; and at said workstation of each of the senders:

accessing the digital image of each of the mailpieces franked on said at least one franking machine of the sender.

* * * * *